United States Patent Office \*\\

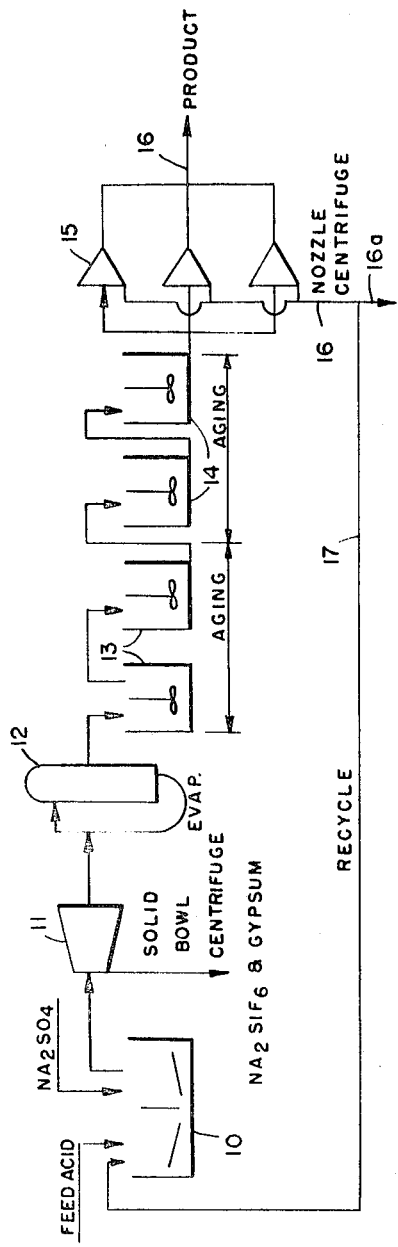

3,455,651
Patented July 15, 1969

3,455,651
CLARIFICATION OF WET PROCESS PHOSPHORIC ACID
William A. Satterwhite, Jack M. Carter, and Thomas L. Carey, Lakeland, Fla., assignors, by mesne assignments, to USS Agri-Chemicals, Inc., Pittsburgh, Pa., a corporation of Delaware
Filed Apr. 4, 1966, Ser. No. 539,806
Int. Cl. C01b 9/08, 25/04, 25/22
U.S. Cl. 23—165          10 Claims

ABSTRACT OF THE DISCLOSURE

Wet process phosphoric acid containing iron and aluminum phosphates, fluoride complexes and other impurities, is clarified by concentrating the acid by evaporation of water and the concentrated acid is cooled and aged for growing crystals first at about 185–150° F. for about 8–16 hours, and then at about 120–80° F. for about 8–16 hours, and the mass is then subjected to crystal separation processing.

---

This invention relates to clarification of wet process phosphoric acid, and more particularly to the production of concentrated clarified wet process phosphoric acid.

Wet process phosphoric acid contains as impurities gypsum (calcium sulfate), gypsum anhydrite, iron and aluminum complex phosphates, and fluoride complexes or compounds. In the concentration of wet process phosphoric acid, such impurities produce sludge, which not only precipitates during manufacturing stages but also at later stages during storage of the acid.

The starting wet process phosphoric feed acid is usually referred to as "30 percent $P_2O_5$" acid even though the actual $P_2O_5$ content varies substantially below and above this stated percentage. Similarly, in the trade parlance, the concentrated acid is referred to as "54 percent $P_2O_5$" acid although the actual $P_2O_5$ content may vary as widely as 40–60 percent $P_2O_5$ acid on a total composition basis.

In the clarification of the wet process phosphoric acid, the feed acid may be first concentrated and thereafter cooled to form crystals, and the acid may then be usbjected to crystal separation processing as by centrifuging, filtering, etc. Such processing, however, does not successfully clarify the wet process acid, and not only are there sludge impurities present during processing but there is a substantial post precipitation of soilds during storage of the acid. This remains true even though the cooled acid is held for a period of time to bring about crystal formation. For example, after storage of 54 percent $P_2O_5$ acid produced by four different companies, it was found that the sludge accumulation after 14 days' storage varied from 7 to 20 percent.

We have discovered that the aging and cooling conditions are of great importance, not only for reducing the dissolved impurities down to their normal solubilities at ambient temperature so that post precipitation cannot occur, but also to effect crystal growth on existing crystals so that the particles are sufficiently large that removal can be achieved effectively by centrifugal separation. By aging the acid at an elevated temperature, say, about 185–150° F., for a substantial period, say, about 8–16 hours, and then cooling and aging the acid for another about 8–16 hours at about 120–80° F., a substantial improvement in crystal growth is obtained and there is a minimum of post precipitation during the storage of the product.

The foregoing process is enhanced by seeding the feed acid with iron phosphate, this being accomplished preferably through the recycling of sludge from the centrifuge to the feed acid and preferably to an extent that the concentrated acid has an iron phosphate content of about 3.4–6.0 percent (preferably 3.6–4.2%) by weight. The process is further enhanced by reducing the fluoride concentration of the feed acid to be concentrated to 1.5 percent or less, and the calcium sulfate content to about 0.1–0.8 percent CaO equivalent.

A primary object, therefore of the invention is to provide a process for the clarification of wet process phosphoric acid containing a minium of impurity solids and providing a minimum of solids precipitation during storage. A further object is to provide a process in which concentrated wet process phosphoric acid is aged and cooled under conditions most favorable for the forming and removal of crystal impurities and for the minimizing of post precipitation of solids. Other specific objects and advantages will appear as the specification proceeds.

The invention is shown, in an illustrative embodiment, by the accompanying drawing, in which there is set out a diagrammatic layout of apparatus in which the invention may be practiced.

In the illustration given, 10 designates a mixer tank into which the feed acid, referred to as 30 percent acid, is introduced. Into the mixer tank is introduced a sodium ion, such as is provided by sodium sulfate, sodium carbonate, etc., so as to bring about a precipitation of sodium silicofluoride and calcium sulfate (gypsum). From the mixer tank, the acid is passed through a centrifuge 11 for the removal of sodium silicofluoride and gypsum, and the acid partially free of such impurities is passed to a concentrator or evaporator 12, which is preferably of the vacuum type and in which water is evaporated to produce the type of acid product generally referred to as 54 percent $P_2O_5$ acid. From the evaporator 12, the acid flows into aging tanks 13 where the acid is held at a temperature preferably of about 185–150° F. for about 8–16 hours. Following this time, the acid is cooled and passed through aging tanks 14 for another period of about 8–16 hours, the temperatuer being held in the range of about 120–80° F. Optimum holding time for tanks 13 was 12 hours, and optimum holding time for the tanks 14 was 12 hours. The acid is gently stirred in the aging tanks to keep the solids in suspension. It will be understood that the temperatures and holding times are interrelated and the beneficial effects described can be obtained by a variation of the temperatures and holding times.

From the aging tanks, the acid is passed to a nozzle centrifuge or to a series of nozzle centrifuges 14, the overflow being drawn off through pipe 16 as clarified product. A portion of the underflow may be withdrawn through pipe 16 and sent to an ammoniation plant 16a for the preparation of ammonium phosphate fertilizer. Another portion of the underflow (sludge) may be recycled through line 17 to the mixer tank 10.

The beneficial effect of the aging stages at the temperature of about 185–150° F. and 120–80° F. is enhanced by recycling through line 17 sufficient iron phosphate to bring the iron phosphate content of the concentrated acid into the range of 3.4–6.0 percent (preferably 3.6–4.2%) by weight.

The process is further enhanced by removing from the feed acid enough of the fluoride complexes to bring the percent thereof in the acid going into the concentrator below about 1.5 percent and to reduce the calcium sulfate content into the range of 0.1–0.8 percent CaO equivalent. By using a solid bowl centrifuge or other efficient separating equipment, the foregoing impurities are removed as sodium silicofluoride and gypsum. By way of example, by adding $Na_2SO_4$ to the feed acid, the sodium ion reacts with fluosilicate ions, precipitating sodium fluosilicate. The sulfate ion converts to free sulfuric acid and suppresses solubility of $CaSO_4$ via common ion effect. Thus, before evaporation to concentrated acid such as to 54 percent $P_2O_5$ acid, these impurities are reduced to a level sufficiently low to achieve a clarified product acid.

If desired, the recycled 54 percent $P_2O_5$ acid may be added to the incoming 30 percent $P_2O_5$ acid to produce a concentration of 35–36 percent $P_2O_5$ acid. At this concentration, it is found that fluorine removed is most practicable. However, satisfactory removal may be accomplished at the $P_2O_5$ range in the general neighborhood of 30 percent $P_2O_5$.

While the removal of fluorine may be accomplished through the use of compounds containing sodium and potassium ions and through known means for the removal of fluorine and fluorides, such as, for example, steam and air stripping, we prefer to use the sodium ions because of the effective control in removing the desired amounts of fluorides, and further the use of such compounds as sodium sulfate and sodium carbonate bring about the removal of other undesired impurities as above described.

Specific examples illustrative of the invention may be set out as follows:

Example I

Wet process phosphoric acid containing iron phosphate in the range of 3.4–4.2 percent and containing a CaO equivalent concentration in the range of 0.1–0.6 percent and a fluoride content of less than 1.5 percent, was subjected to different aging or cooling conditions as set out in the following table and with the results indicated, the test storage period being two weeks:

TABLE

| Example | Aging | Cooling | Dissolved impurities | | | Resulting acid solids, percent | Clarified acid solids, percent | Post Precip. solids, percent | Total solids after storage, percent |
| --- | --- | --- | --- | --- | --- | --- | --- | --- | --- |
| | | | $Fe_2O_3$, percent | CaO, percent | F, percent | | | | |
| Case 1 | 12 hrs. at 165° F | None | 1.85 | 0.20 | 0.97 | 7.23 | 0.16 | 3.0 | 3.2 |
| Case 2 | 12 hrs. at 165° F | 6 hrs. at 100° F | 1.78 | 0.06 | 0.93 | 7.54 | 0.37 | 2.5 | 2.9 |
| Case 3 | 12 hrs at 165° F | 12 hrs. at 100° F | 1.51 | 0.07 | 0.80 | 9.00 | 0.50 | 0.4 | 0.9 |
| Case 4 | 18 hrs. at 165° F | None | 1.88 | 0.10 | 1.06 | 7.38 | 0.60 | 3.0 | 3.6 |
| Case 5 | 18 hrs. at 165° F | 6 hrs. at 100° F | 1.76 | 0.07 | 0.61 | 9.62, | 0.16 | 1.4 | 1.6 |

As shown by the above table, the conditions in case 3 produced a stable, clarified 54 percent $P_2O_5$ acid. Holding periods of 8–12 hours at each of the temperatures, namely, about 165° F. and 100° F., gave total solids of less than one percent in the product and with a post precipitation of solids of less than one percent. The total solids after two weeks' storage was slightly in excess of one percent.

Example II

The process was carried out as described in Example I except that the aging period at 165° F. and at 100° F. was 10 hours, the solids in the acid product being 1.07 percent, and the solids in the product acid after two weeks' storage being 1.31 percent.

Improved results in the removal of crystallized impurities were accomplished by using the optimum conditions of aging after 12 hours at 165° F. followed by aging for 12 hours at 100° F., even though the fluorides and the calcium sulfate were not reduced in content and the feed acid was not seeded with iron phosphate. The aging steps, however, were greatly enhanced in effectiveness when the feed acid was seeded with iron phosphate and the fluoride complexes and calcium sulfate reduced in amount.

While in the foregoing specification we have set out a specific process in considerable detail for the purpose of illustrating embodiments of our invention, it will be understood that such details may be varied widely by those skilled in the art without departing from the spirit of our invention.

We claim:

1. In a process for clarifying wet process phosphoric acid containing iron phosphates, fluoride complexes and other impurities, the steps of reacting with such wet process phosphoric acid prior to the concentration thereof a compound selected from the group consisting of sodium sulfate and sodium carbonate to precipitate sodium silicofluoride and calcium sulfate, centrifuging the acid to remove precipitated material and to bring the fluoride content of the acid below 1.5% by weight and the calcium sulfate into the range of 0.1–0.8 CaO equivalent, heating the acid to concentrate it, aging the acid at approximately a constant temperature within the range of about 185–150° F. for about 8–16 hours, and at approximately a constant temperature within the range of about 120–80° F. for about 8–16 hours, and centrifuging the acid to separate the acid product from sludge impurities.

2. The process of claim 1 in which the wet process phosphoric acid is seeded with iron phosphate crystals before completing the concentration.

3. The process of claim 1 in which said sludge impurities containing iron phosphate crystals are recycled and mixed with the wet process phosphoric acid to be concentrated.

4. The proces sof claim 1 in which the concentrated acid is aged for about 12 hours at 185–150° F., cooled and then aged for about 12 hours at about 120–80° F.

5. The process of claim 3 in which the recycled sludge brings the iron phosphate of the concentrated acid to about 3.4–6.0%.

6. The process of claim 1 in whic hthe compound is sodium sulfate.

7. A process for clarifying wet process phosphoric acid containing iron and aluminum phosphates, fluoride complexes, and other impurities, in which process feed acid is concentrated by evaporation of water and the concentrated acid cooled to form crystals and then subjected to crystal separation processing, characterized in that said acid in the cooling stage is aged for growing crystals first at approximately a constant temperature within the range of about 185–150° F. for from about 8–16 hours and then at approximately a constant temperature within the range of about 120–80° F. for about 8–16 hours.

8. In a process for clarifying wet process phosphoric acid containing iron phosphates, fluoride complexes and other impurities, the steps of treating such wet process phosphoric feed acid prior to concentration with an agent selected from the group consisting of sodium sulfate and sodium carbonate to precipitate fluoride complexes and calcium sulfate, centrifuging the acid to remove fluoride complexes and calcium sulfate, seeding the feed acid with iron phosphate, heating the acid to concentrate it, aging the acid at approximately a constant temperature within the range of about 185–150° F. for about 8–16 hours, aging the acid at approximately a constant temperature within the range of about 120–80° F. for about 8–16 hours, and centrifuging the acid.

9. The process of claim 8 in which a portion of the centrifuged acid containing iron phosphate is recycled and mixed with the feed acid to bring the iron phosphate content of the concentrated acid to about 3.6–4.2 percent.

10. The process of claim 8 in which the fluoride complexes are removed to a point below 1.5 percent by weight.

References Cited

UNITED STATES PATENTS

| | | | |
|---|---|---|---|
| 2,883,266 | 4/1959 | Hodges et al. | 23—165 |
| 2,917,367 | 12/1959 | Hodges et al. | 23—165 |
| 2,936,888 | 5/1960 | Williams | 23—165 X |
| 3,206,282 | 9/1965 | Crawford et al. | 23—165 |
| 3,333,929 | 8/1967 | Mazurek et al. | 23—305 |

E. C. THOMAS, Primary Examiner

A. GREIF, Assistant Examiner

U.S. Cl. X.R.

23—301, 305